(12) United States Patent
El Dirani

(10) Patent No.: US 12,372,723 B2
(45) Date of Patent: Jul. 29, 2025

(54) METHOD FOR MANUFACTURING A SEMICONDUCTOR DEVICE

(71) Applicant: STMicroelectronics (Crolles 2) SAS, Crolles (FR)

(72) Inventor: Houssein El Dirani, Draveil (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 343 days.

(21) Appl. No.: 18/152,435

(22) Filed: Jan. 10, 2023

(65) Prior Publication Data

US 2023/0258866 A1 Aug. 17, 2023

(51) Int. Cl.
  *G02B 6/136* (2006.01)
  *G02B 6/12* (2006.01)
  *G02B 6/132* (2006.01)

(52) U.S. Cl.
  CPC ............ *G02B 6/136* (2013.01); *G02B 6/132* (2013.01); *G02B 2006/12061* (2013.01)

(58) Field of Classification Search
  CPC ................. G02B 6/136; G02B 6/132; G02B 2006/12061; G02B 2006/121; G02B 2006/12176; H01L 21/56; H01L 23/291; H01L 23/3171; H01L 23/3192
  See application file for complete search history.

(56) References Cited

U.S. PATENT DOCUMENTS

2015/0048497 A1* 2/2015 Henderson ............ H10F 19/75
  257/737

2016/0327743 A1 11/2016 Kippenberg et al.
2021/0278214 A1 9/2021 Paniccia et al.

FOREIGN PATENT DOCUMENTS

EP 1237019 A2 9/2002

OTHER PUBLICATIONS

Houssein, El Dirani et al., "Ultralow-loss tightly confining Si3N4 waveguides and high-Q microresonators", Optics Express 30726, vol. 27, No. 21, Oct. 14, 2019, 15 pages.
Pfeiffer, Martin H., et al., "Photonic Damascene process for integrated high-Q microresonator based nonlinear photonics", Optica 20, vol. 3, No. 1, Jan. 2016, 6 pages.

* cited by examiner

*Primary Examiner* — John Bedtelyon
(74) *Attorney, Agent, or Firm* — Slater Matsil, LLP

(57) ABSTRACT

In accordance with an embodiment, a method for manufacturing a semiconductor device includes forming a first front layer and a first rear layer of a first material respectively on a front main face and a rear main face of a semiconductor substrate wafer; forming a first plurality of trenches and a second plurality of trenches respectively in a surface of the first front layer and in a surface of the first rear layer; forming a second front layer of a second material on the first front layer, where the second front layer extends over the first front layer, in the first plurality of trenches, and between the first plurality of trenches on the surface of the first front layer; and forming a second rear layer of the second material on the surface of the first rear layer, wherein the second rear layer extends over the first rear layer, in the second plurality of trenches, and between the second plurality of trenches on the surface of the first rear layer.

20 Claims, 3 Drawing Sheets

METHOD FOR MANUFACTURING A SEMICONDUCTOR DEVICE

CROSS-REFERENCE TO RELATED APPLICATIONS

This application claims the benefit of French Patent Application No. 2201268, filed on Feb. 14, 2022, which application is hereby incorporated herein by reference.

TECHNICAL FIELD

Embodiments and implementations relate to a method of manufacturing a semiconductor device.

BACKGROUND

A semiconductor device, in particular an integrated circuit, can be manufactured from a semiconductor substrate wafer. This wafer is also designated by the expression semiconductor wafer hereinafter.

Manufacturing a semiconductor device may comprise forming a plurality of layers of material on the semiconductor substrate wafer. Once formed, the various layers applied may undergo internal tensile strains or compressive strains that are different according to their nature. The internal tensile or compressive strains in a layer cause an expansion or compression of this layer.

Some layers may not fully cover the surface of the semiconductor wafer and be arranged in a predetermined pattern. Such layers are used for obtaining a technical effect not uniformly over the surface of the semiconductor but only in a predetermined pattern. These layers are generally formed on a front main face of the semiconductor wafer. For example, such layers may be used to form waveguides distributed in the predetermined pattern.

A layer of material distributed over the surface of the semiconductor wafer in a predetermined pattern has smaller internal strains compared with the same layer extending over the whole of the surface of the semiconductor wafer.

There are several methods for obtaining such layers distributed over the semiconductor wafer in a predetermined pattern. For example, it is possible to form a layer uniformly distributed over the semiconductor wafer and then to implement an etching on this layer in the predetermined pattern.

In order to obtain a layer distributed over the semiconductor wafer in a predetermined pattern, it is also possible to implement damascening. Damascening comprises a deposition of a layer in trenches formed in a layer of material formed on the semiconductor substrate wafer in the predetermined pattern.

Nevertheless, in some manufacturing methods, the layer distributed in the predetermined pattern is formed so that the same layer is simultaneously formed uniformly on a rear main face of the semiconductor wafer. For example, these two layers may be formed simultaneously by low-pressure chemical vapor deposition. The internal strains on the layer located on the rear main face of the semiconductor wafer and those on the layer located on the front main face are then different. This is because, as seen previously, a layer of material distributed over the surface of the semiconductor wafer in a predetermined pattern has smaller internal strains compared with the same layer extending over the whole of the surface of the semiconductor wafer.

The internal strains on the layer located on the front main face are then smaller than the internal strains on the layer located on the rear main face of the semiconductor wafer. This difference in internal forces in the layers on each side of the semiconductor wafer may cause curving of the semiconductor wafer and cracks may appear on the layer located on the rear main face.

The risk of causing curving of the semiconductor wafer and cracks is all the greater when the semiconductor wafer has a large diameter, for example greater than 200 millimeters.

The machine used for producing the semiconductor device may then not recognize the semiconductor wafer because of its curved surface. Furthermore, the cracks may cause dispersion, in the machine, of the material of the deposited layer. This dispersion of material then contaminates the machine, which is adapted for operating under vacuum. To reestablish the vacuum, the machine implements a decontamination, which causes a temporary suspension of the manufacture of the integrated circuits. Such a temporary suspension of the manufacture of the integrated circuits then gives rise to an increase in the manufacturing cost of the integrated circuits.

There is therefore a need to propose a solution for such manufacturing methods making it possible to avoid curving of the semiconductor wafer and an appearance of cracks on the layers deposited.

SUMMARY

According to one aspect, a method for manufacturing a semiconductor device is proposed, including: obtaining a semiconductor substrate wafer having a front main face and a rear main face; forming a first layer of a first material on each main face of the semiconductor substrate wafer; forming a plurality of trenches on the surface of the first layer formed on the front main face; forming a second layer of a second material on each first layer, so that a second front layer of second material extends over the first layer formed on the front main face of the semiconductor substrate wafer, in the trenches and between the trenches of the first layer, and so that a second rear layer of second material extends over the first layer formed on the rear main face of the semiconductor substrate wafer.

The method further comprises, before the formation of the second layers of second material, a formation of trenches on the first layer of first material formed on the rear main face of the semiconductor substrate wafer, so that, after the formation of the second layers of second material, the second rear layer of second material extends over the first layer formed on the rear main face in the trenches and between the trenches of this first layer.

In other words, in such a manufacturing method, damascening is implemented on the front main face of the semiconductor wafer as well as on the rear main face of the semiconductor wafer.

The damascening on the rear main face makes it possible to obtain trenches used for reducing the internal strains on the second layer formed on this same side. In this way, the difference between the internal strains on the second layer formed on the front main face and those on the second layer formed on the rear main face is reduced. Reducing this difference makes it possible to reduce a risk of curving the semiconductor wafer and of the appearance of cracks on the second layers, and therefore makes it possible to avoid a risk of contamination of a machine used for manufacturing the semiconductor device.

Such a method improves, or even allows, the formation of a second layer distributed in a predetermined pattern on a semiconductor wafer of large diameter, for example greater than 200 millimeters, in particular around 300 millimeters, and therefore makes it possible to use semiconductor wafers that can contain a larger number of integrated circuits.

Preferably, the second layers are formed simultaneously by low-pressure chemical vapor deposition. Advantageously, the first layers are formed by oxidation of the semiconductor substrate wafer.

According to one embodiment, a levelling step is implemented on each side of the semiconductor substrate wafer so as to remove a thickness of the second layer so that these second layers extend solely in the trenches formed in the first layers. According to an advantageous embodiment, the levelling step is a step of chemical-mechanical polishing.

According to one embodiment, the first material and the second material are selected so that at least one of the trenches filled with the second material on the front main face of the semiconductor substrate wafer forms at least one waveguide. Thus, one or more trenches on the front main face serve for forming one or more waveguides. Some other trenches on the front main face are used solely for reducing the internal strains on the second layer on the front main face.

In a variant or in combination, the first material and the second material are selected so that at least one of the trenches filled with the second material on the rear main face of the semiconductor substrate wafer forms at least one waveguide. Thus, one or more trenches on the rear main face serve for forming one or more waveguides. Some other trenches on the rear main face are used solely for reducing the internal strains on the second layer on the rear main face. According to one embodiment, the first material is silicon dioxide and the second material is silicon nitride.

According to another aspect, a semiconductor device is proposed including a semiconductor substrate wafer having a front main face and a rear main face, a first layer disposed on each main face of the substrate, the first layer disposed on the front main face having a surface whereon a plurality of trenches are disposed, and a second front layer of second material extending on the first layer disposed on the front main face of the semiconductor substrate wafer, in the trenches and between the trenches of the first layer, wherein the first layer disposed on the rear main face has a surface on which a plurality of trenches are disposed and a second rear layer of second material extends over the first layer disposed on the rear main face of the semiconductor substrate wafer, in the trenches and between the trenches of this first layer.

Preferably, the first material and the second material are selected so that at least one of the trenches filled with second material on the front main face of the semiconductor substrate wafer constitutes at least one waveguide. Advantageously, the first material and the second material are selected so that at least one of the trenches filled with second material on the rear main face of the semiconductor substrate wafer constitutes at least one waveguide. Advantageously, the first material is silicon dioxide and the second material is silicon nitride.

BRIEF DESCRIPTION OF THE DRAWINGS

Other advantages and features of the invention will emerge from the examination of the detailed description of an embodiment and an implementation that are in no way limitative, and the accompanying drawings, on which.

DETAILED DESCRIPTION OF ILLUSTRATIVE EMBODIMENTS

Embodiments and implementations relate to a method of manufacturing a semiconductor device. Some embodiments relate to the manufacture of a semiconductor device from a semiconductor substrate wafer and the formation of a layer of material on a semiconductor substrate wafer according to a predetermined pattern.

Figure 1:
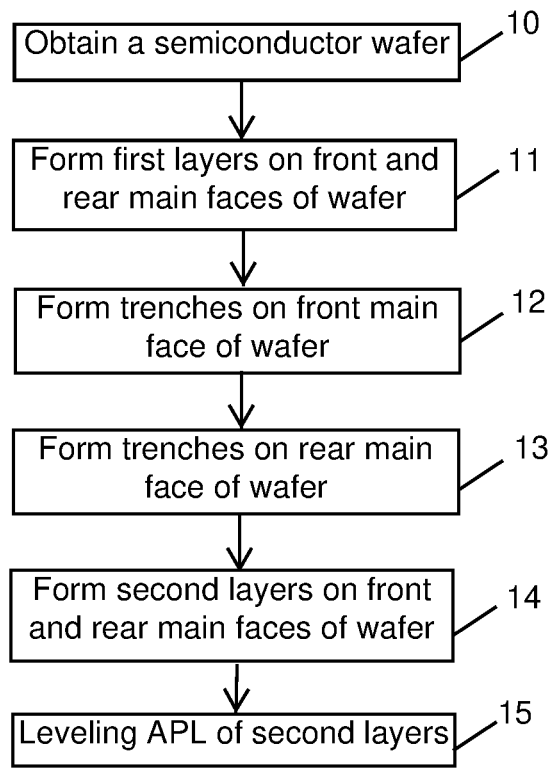
FIG. 1 schematically illustrates an embodiment of a method for manufacturing a semiconductor device.

FIG. 1 illustrates schematically an embodiment of a method for manufacturing a semiconductor device DISP. Such a manufacturing method is used for forming a semiconductor device DISP illustrated according to a first embodiment in FIG. 2 for example.

Figure 2:
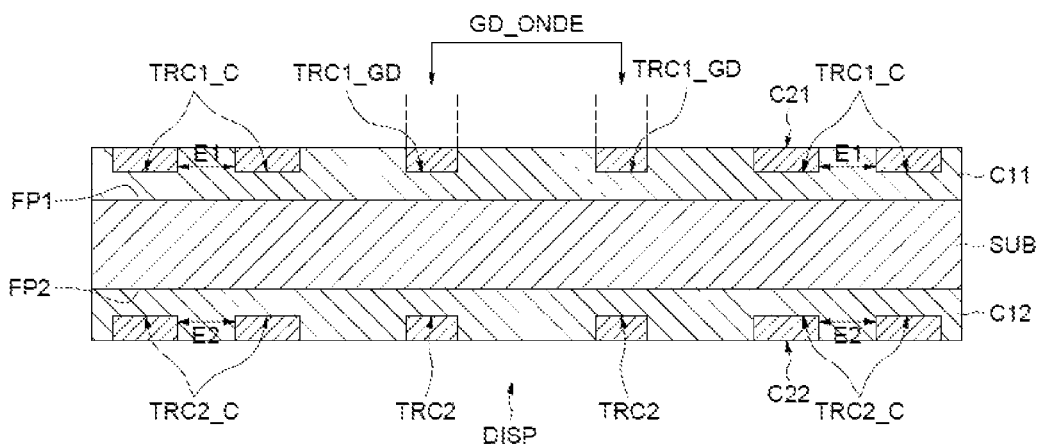
FIGS. 2, 3, 4, 5, 6, 7, 8 and 9 illustrate cross section diagrams of embodiment semiconductor devices.

In this embodiment illustrated in FIG. 2 in a view in cross section, the semiconductor device DISP includes a layer of material C21 obtained by damascening on a front main face of a semiconductor wafer SUB. The damascening can then be used for forming the waveguides GD_ONDES from the layer C21 of material.

In the semiconductor device illustrated in FIG. 2, the layer C21 of material is thus distributed over the front main face of the semiconductor wafer SUB in a predetermined pattern from a simultaneous deposition of the layer C21 of material on the whole of the front main face and an identical layer C22 over the whole of a rear main face of the semiconductor wafer SUB.

The material of the layers C21, C22 may have a relatively high tensile strength, so that the layers C21 and C22 may undergo high internal strains in expansion or compression after deposition thereof. The material of the layers C21, C22 may for example be silicon nitride ($Si_3N_4$), which has a tensile strength of 1 GPa.

The damascening implemented on the layer C21 reduces the internal strains under expansion or compression of the layer C21. However, a large difference between the internal strains on the front layer C21 and those on the rear layer C22 may cause curving of the semiconductor wafer SUB.

In order to reduce the difference between the internal strains on the layers C21 and C22, the manufacturing method proposes also to implement damascening of the rear layer C22 to reduce the internal strains on the layer C22.

Such a manufacturing method thus makes it possible to form a layer of material by damascening on a semiconductor wafer SUB having a diameter of several hundreds of millimeters, for example greater than 200 millimeters, in particular of the order of 300 millimeters, while reducing or even eliminating a risk of curving of the wafer and the appearance of cracks on the rear layer C22.

The dimensions of the wafer then make it possible to form a larger number of integrated circuits from one and the same semiconductor wafer.

Figure 3:
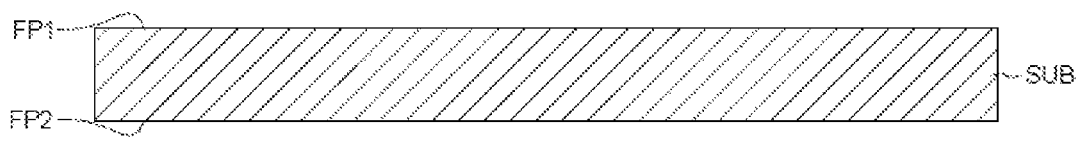

In particular, the manufacturing method comprises obtaining 10 a semiconductor wafer SUB as shown in FIG. 3 in a view in cross section.

The semiconductor wafer SUB is formed from a semiconductor material, such as silicon (Si), normally used for manufacturing integrated circuits. The semiconductor wafer may have a disc shape for example.

As seen previously, the semiconductor wafer SUB has a front main face FP1 and a rear main face FP2. The front main face FP1 and/or the rear main face FP2 can serve as a support for forming semiconducting and photonic components. For example, in the embodiment in FIG. 2, only the front main face FP1 serves as a support for forming semiconducting and photonic components, and in particular waveguides GD_ONDE.

To implement the damascening of each side of the semiconductor wafer, the method comprises a simultaneous formation 11 of a layer C11 on the front main face FP1 of the wafer and of a rear layer C12 on the rear main face FP2 of the wafer by oxidation OX of the semiconductor wafer SUB.

Figure 4:
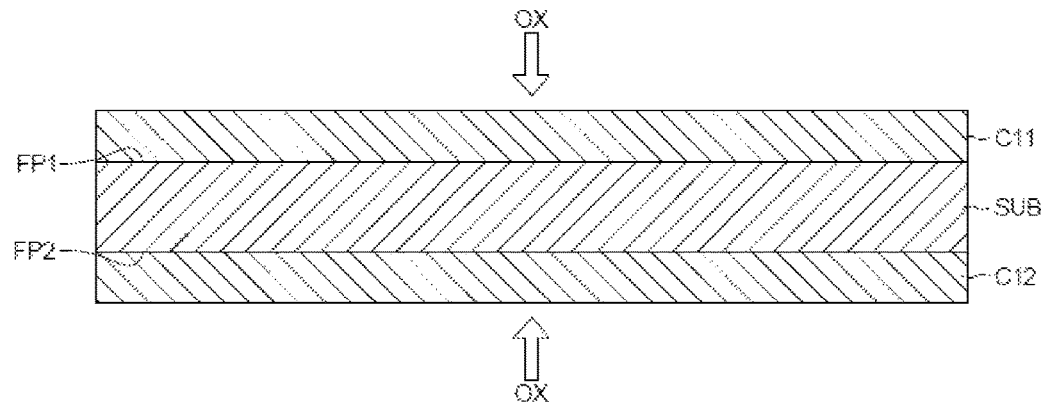

FIG. 4 illustrates a view in cross section of a result that can be obtained following this formation 11. The layers Cu. and C12 are then formed from a first material, typically silicon dioxide ($SiO_2$), and generally have a thickness greater than 1.5 µm.

To implement the damascening of each side of the semiconductor wafer, the manufacturing method next comprises a formation 12 of a plurality of trenches TRC1 on the surface of the layer C11 formed on the front main face FP1 in the pattern required for the damascening of the layer C21 of material. In particular, the trenches TRC1 comprise trenches TRC1_C and trenches TRC1_GD.

The trenches TRC1_C are used solely for reducing the internal strains on the layer C21 of material that is subsequently deposited on the layer C11. The trenches TRC1_C are distributed over the whole of the semiconductor wafer SUB.

The trenches TRC1_C thus make it possible to avoid the appearance of cracks on the surface of the front main face of the substrate SUB. It may be advantageous to provide a distance E1 between the trenches TRC1_C that is less than or equal to 10 µm and a width of the trenches TRC1_C that is less than or equal to 5 µm.

The trenches TRC1_GD can be used to subsequently form waveguides GD_ONDE. These trenches TRC1_GD also reduce the strains on the layer C21 that is subsequently deposited on the layer C11, but are not sufficient by themselves alone to avoid the appearance of cracks on the surface of the front main face of the substrate SUB. The trenches TRC1_GD then have a width less than or equal to 2 µm for example.

The method next comprises a formation 13 of a plurality of trenches TRC2 on the surface of the layer C12 formed on the rear main face FP2.

The trenches TRC2 comprise trenches TRC2_C used solely for reducing the internal strains on the layer C22 of material which is subsequently deposited on the layer C12.

It may be advantageous to provide a distance E2 between the trenches TRC2_C that is less than or equal to 10 µm and a width of the trenches TRC2_C that is less than or equal to 5 µm.

Figure 5:
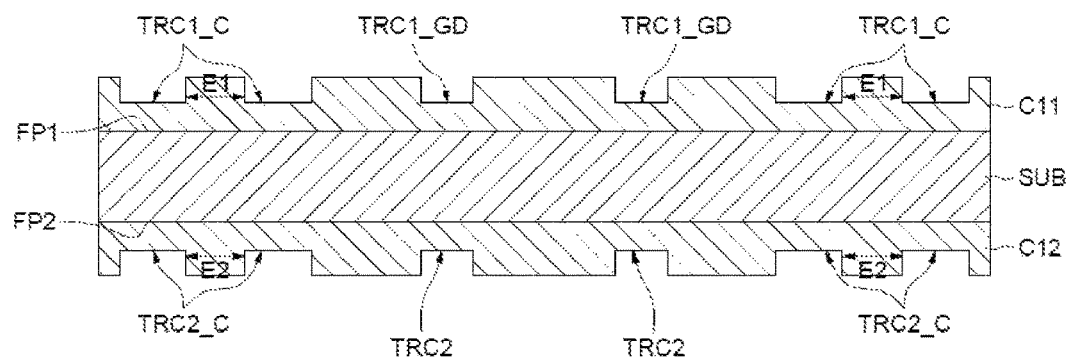

FIG. 5 illustrates a view in cross section of a result that can be obtained following the formations 12 and 13. Naturally it is possible to reverse the order of implementation of the formations 12 and 13 of the trenches TRC1 and TRC2 so that the trenches TRC2 can be formed before the trenches TRC1. These trenches TRC1, TRC2 can be formed using an etching technique well known to a person skilled in the art. It is possible for example to provide lithography followed by etching of the layers C11 and C12 to form the trenches TRC1 and TRC2.

The trenches TRC1 and the trenches TRC2 can be arranged in predetermined patterns independent of each other.

To implement the damascening of each side of the semiconductor wafer, the manufacturing method also comprises a simultaneous formation 14 of layers C21 and C22 in a second material on the layers C11 and C12 formed by oxidation of the semiconductor wafer.

In particular, the layers C21 and C22 can be formed simultaneously by low-pressure chemical vapor deposition (also known by the acronym "LPCVD"), for example at a pressure of between 13.3 Pa and 40 Pa (i.e., between 100 mTorr and 300 mTorr).

Figure 6:
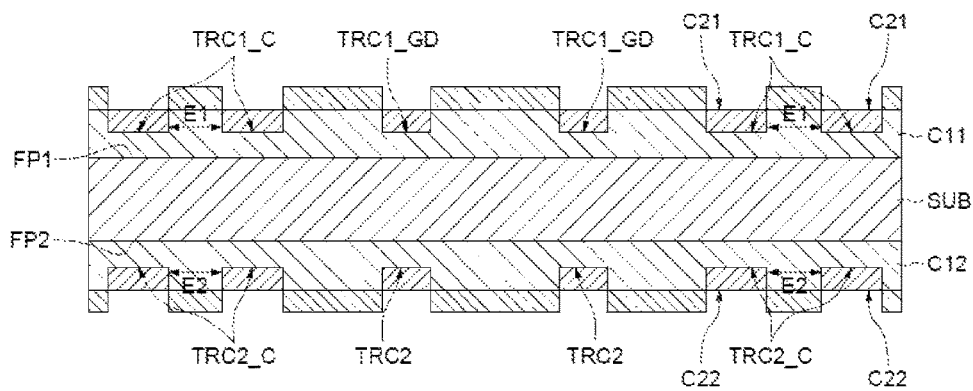

FIG. 6 illustrates a view in cross section of a result that can be obtained by using the formation 14 of the layers C21 and C22. Thus, as illustrated on FIG. 6, a front layer C21 is formed on the layer C11 and a rear layer C22 is formed on the layer C12. The front layer C21 then extends over the length C11 in the trenches TRC1 and between the trenches TRC1, and the layer C22 extends over the rear layer C12 in the trenches TRC2 and between the trenches TRC2. The trenches TRC1 and TRC2 can be designed to have a depth greater than or equal to the thickness of the layers C21 and C22 in order to fully contain the layers C21 and C22 formed in the trenches TRC1 and TRC2.

A person skilled in the art will be able to adapt the depth of the trenches TRC1 and TRC2 according to the thickness of the layers of second material to be deposited. The thickness of the layers C21 and C22 can furthermore vary according to the applications of the semiconductor device. For example, to produce waveguides with the portions of layers C21 located in the trenches TRC1_GD, the portions of layers C21 can have a thickness of silicon nitride of between 1200 Å and 2000 Å.

Forming the trenches TRC2 makes it possible to obtain a discontinuous layer C22 that has portions extending in the trenches TRC2 and other portions extending between the trenches. In this way, the internal strains on the layer C22 are also reduced in comparison with a layer with the same thickness and the same material that continuously covered the rear main face of the semiconductor wafer.

In particular, it is advantageous to provide a distance E2 between the trenches TRC2 less than or equal to 10 µm and a width of the trenches TRC2 less than or equal to 5 µm in order to sufficiently reduce the internal strains on the layer C22.

Reducing the internal strains on the layer C22 makes it possible to reduce a difference between the internal strains on the layer C21 and those on the layer C22 in order to reduce or even eliminate a risk of curving of the semiconductor wafer SUB and the appearance of cracks on the layer C22.

Furthermore, the simultaneous formation of the layers C21 and C22 makes it possible to maintain the equilibrium between the internal strains on the layers C21 and C22 on each side of the semiconductor wafer SUB.

The method next comprises a step 15 of levelling APL of the layers C21 and C22.

Figure 7:
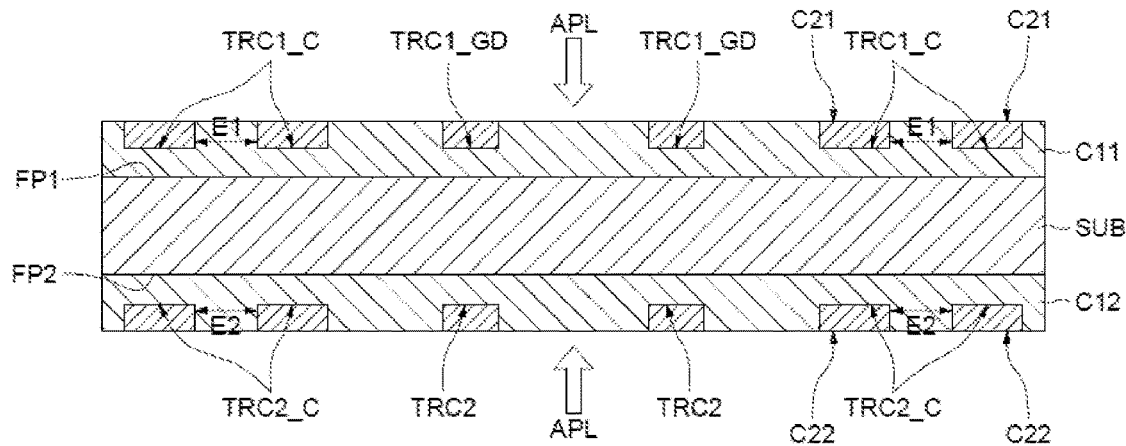

FIG. 7 illustrates a result that can be obtained following an implementation of such a levelling APL step 15. The levelling APL is implemented on each side of the semiconductor wafer SUB. Preferably, the levelling APL is a chemical-mechanical polishing. In particular, the levelling APL of the layer C21 is implemented so as to remove the portions of the layer C21 between the trenches TRC1 and the levelling APL of the layer C22 is implemented so as to remove the portions of the layer C22 between the trenches TRC2. Thus, the layers C21 and C22 extend only in the trenches TRC1 and TRC2 respectively formed in the layers Cu. and C12.

As indicated previously in relation to FIG. 2, the trenches TRC1_GD filled with the material of the layer C21 can form waveguides GD_ONDE. The pattern used for the damascening of the layer C21 can then be defined according to the required location of the waveguides GD_ONDE.

Naturally, embodiments of the present invention is capable of various variants and modifications that would appear to a person skilled in the art.

Figure 8:
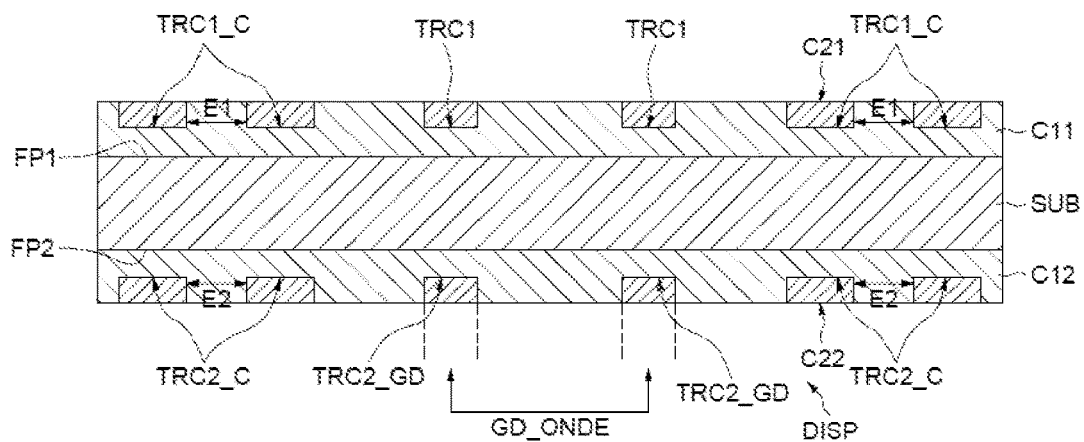

For example, FIG. 8 illustrates a view in cross section of an embodiment of a semiconductor device in which only the rear main face FP2 serves as a support for a formation of semiconducting and photonic components.

Thus, for example, the trenches TRC2 include trenches TRC2_GD used for forming waveguides GD_ONDE on the rear main face of the semiconductor wafer SUB. The trenches TRC2_GD then have a width less than or equal to 2 µm for example.

Furthermore, the trenches TRC1 on the front main face include solely trenches TRC1_C and therefore do not include trenches TRC1_GD used for forming waveguides.

Figure 9:
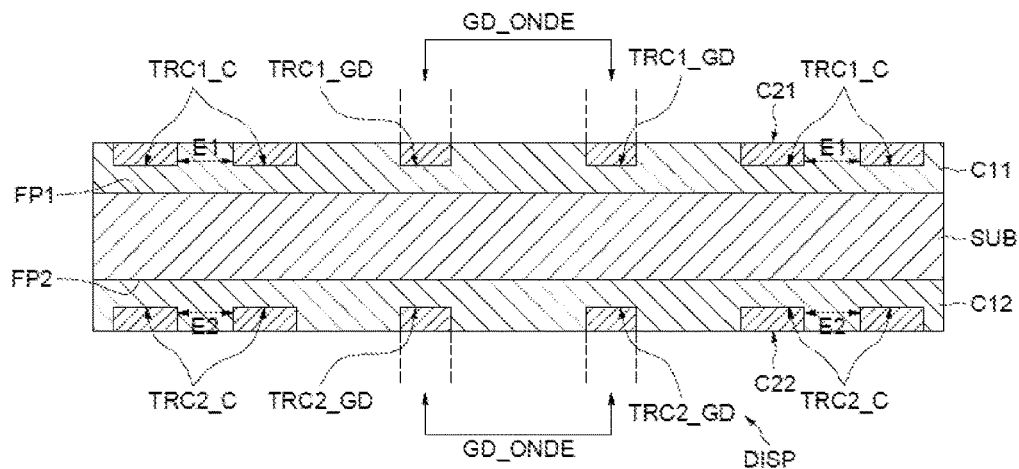

In a variant, as illustrated in FIG. 9 in a view in cross section of another embodiment of a semiconductor device, the front main face FP1 and the rear main face FP2 can both serve as a support for forming semiconducting and photonic components.

Thus, for example, the trenches TRC1 and the trenches TRC2 include respectively trenches TRC1_GD and trenches TRC2_GD used for forming waveguides GD_ONDE on the front main face and on the rear main face of the semiconductor layer SUB.

What is claimed is:

1. A method for manufacturing a semiconductor device, the method comprising:
   forming a first front layer of a first material on a front main face of a semiconductor substrate wafer;
   forming a first rear layer of the first material on a rear main face of the semiconductor substrate wafer;
   forming a first plurality of trenches in a surface of the first front layer;
   forming a second front layer of a second material on the first front layer, wherein the second front layer extends over the first front layer, in the first plurality of trenches, and between the first plurality of trenches on the surface of the first front layer;
   forming a second plurality of trenches in a surface of the first rear layer; and
   forming a second rear layer of the second material on the surface of the first rear layer, wherein the second rear layer extends over the first rear layer, in the second plurality of trenches, and between the second plurality of trenches on the surface of the first rear layer.

2. The method according to claim 1, wherein the second front layer and the second rear layer are formed simultaneously using low-pressure chemical vapor deposition.

3. The method according to claim 1, wherein the first front layer and the first rear layer are formed by oxidation of the semiconductor substrate wafer.

4. The method according to claim 3, further comprising:
   levelling the semiconductor substrate wafer, levelling comprising reducing a thickness of the second front layer and the second rear layer such that the second front layer extends solely within the first plurality of trenches, and the second rear layer extends solely within the second plurality of trenches.

5. The method according to claim 4, wherein levelling comprises performing chemical-mechanical polishing.

6. The method according to claim 1, wherein the first material and the second material are selected so that at least one of the first plurality of trenches or the second plurality of trenches filled with the second material forms at least one waveguide.

7. The method according to claim 6, wherein the first material is silicon dioxide and the second material is silicon nitride.

8. The method according to claim 6, wherein:
   at least one of the first plurality of trenches filled with the second material forms a first waveguide; and
   at least one of the second plurality of trenches filled with the second material forms a second waveguide.

9. The method according to claim 1, wherein:
   a width of each of the first plurality of trenches is less than or equal to 5 µm;
   a width of each of the second plurality of trenches is less than or equal to 5 µm;
   a distance between the first plurality of trenches is less than or equal to 10 µm; and
   a distance between the second plurality of trenches is less than or equal to 10 µm.

10. The method according to claim 1, wherein the first plurality of trenches and the second plurality of trenches are configured to reduce a difference between internal strains of the second front layer and internal strains of the second rear layer.

11. A semiconductor device comprising:
    a semiconductor substrate wafer having a front main face and a rear main face;
    a first front layer comprising a first material disposed on the front main face and comprising a first plurality of trenches disposed therein;
    a second front layer comprising a second material extending over the first front layer and disposed within the first plurality of trenches and between the first plurality of trenches;
    a first rear layer comprising the first material disposed on the rear main face and comprising a second plurality of trenches disposed therein; and
    a second rear layer comprising the second material extending over the first rear layer and disposed within the second plurality of trenches and between the second plurality of trenches.

12. The semiconductor device according to claim 11, wherein the first material and the second material are selected so that at least one of the first plurality of trenches or the second plurality of trenches filled with the second material forms at least one waveguide.

13. The semiconductor device according to claim 12, wherein the first material is silicon dioxide and the second material is silicon nitride.

14. The semiconductor device according to claim 11, wherein at least one of the first plurality of trenches or the second plurality of trenches filled with the second material forms at least one waveguide.

15. A semiconductor device comprising:
    a semiconductor substrate wafer having a front main face and a rear main face;
    a first front layer comprising a first material disposed on the front main face and comprising a first plurality of trenches disposed therein, wherein at least one of the first plurality of trenches is filled with a second material; and
    a first rear layer comprising the first material disposed on the rear main face and comprising a second plurality of trenches disposed therein, wherein at least one of the second plurality of trenches is filled with the second material.

16. The semiconductor device according to claim 15, wherein the first material and the second material are selected so that at least one of the first plurality of trenches or the second plurality of trenches filled with the second material forms at least one waveguide.

17. The semiconductor device according to claim 16, wherein the first material is silicon dioxide and the second material is silicon nitride.

18. The semiconductor device according to claim 15, wherein:
   a width of each of the first plurality of trenches is less than or equal to 5 µm;
   a width of each of the second plurality of trenches is less than or equal to 5 µm;
   a distance between the first plurality of trenches is less than or equal to 10 µm; and
   a distance between the second plurality of trenches is less than or equal to 10 µm.

19. The semiconductor device according to claim 15, wherein at least one of the first plurality of trenches or the second plurality of trenches filled with the second material forms at least one waveguide.

20. The semiconductor device according to claim 15, wherein a depth of the first plurality of trenches or the second plurality of trenches is between 1200 Å and 2000 Å.

* * * * *